(12) United States Patent
Yan et al.

(10) Patent No.: US 11,838,783 B2
(45) Date of Patent: Dec. 5, 2023

(54) METHOD AND APPARATUS FOR DETERMINING MEASURED VALUE OF REFERENCE SIGNAL

(71) Applicant: Huawei Technologies Co., Ltd., Shenzhen (CN)

(72) Inventors: Mao Yan, Chengdu (CN); Huang Huang, Chengdu (CN); Hua Shao, Shenzhen (CN); Lei Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 17/237,658

(22) Filed: Apr. 22, 2021

(65) Prior Publication Data

US 2021/0243635 A1     Aug. 5, 2021

Related U.S. Application Data

(63) Continuation of application No. PCT/CN2019/101997, filed on Aug. 22, 2019.

(30) Foreign Application Priority Data

Oct. 22, 2018 (CN) .......................... 201811232063.4

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0051* (2013.01); *H04L 27/26025* (2021.01)

(58) Field of Classification Search
None
See application file for complete search history.

(56) References Cited

U.S. PATENT DOCUMENTS

2014/0364065 A1    12/2014    Pu et al.
2019/0053182 A1*    2/2019    Choi ................. H04W 48/12
(Continued)

FOREIGN PATENT DOCUMENTS

CN    103209475 A    7/2013
CN    103997780 A    8/2014
(Continued)

OTHER PUBLICATIONS

Huawei et al., "On NR carrier aggregation", 3GPP TSG RAN WG1 Meeting #90, R1-1712160, Prague, Czech Republic, Aug. 21-25, 2017, 11 pages.
Samsung, "Potential Techniques for NR Positioning", 3GPP TSG RAN WG1 Meeting #95, R1-1812972, Spokane, WA, US, Nov. 12-16, 2018, 6 pages.
(Continued)

*Primary Examiner* — Scott M Sciacca
(74) *Attorney, Agent, or Firm* — Slater Matsil, LLP

(57) ABSTRACT

This application relates to the field of communications technologies. A method includes: A first device receives first configuration information sent by a second device. The first configuration information includes at least one of information about a reference signal, frequency range information of a radio frequency signal, or bandwidth range information. The first device measures a first reference signal set, to obtain a first measured value. The first reference signal set includes at least two reference signals. The first device determines an expansion factor α based on the first configuration information. The first device determines a second measured value based on the first measured value and the expansion factor α.

25 Claims, 6 Drawing Sheets

(51) Int. Cl.
*H04L 7/00* (2006.01)
*H04W 56/00* (2009.01)
*H04W 64/00* (2009.01)
*H04L 27/26* (2006.01)

(56) References Cited

U.S. PATENT DOCUMENTS

| | | | | |
|---|---|---|---|---|
| 2019/0141554 | A1* | 5/2019 | Siomina | H04W 64/003 |
| 2019/0297489 | A1* | 9/2019 | Lei | H04W 8/24 |
| 2019/0364536 | A1* | 11/2019 | Sadiq | H04W 64/003 |

FOREIGN PATENT DOCUMENTS

| | | | |
|---|---|---|---|
| CN | 104010322 | A | 8/2014 |
| CN | 104937866 | A | 9/2015 |
| CN | 106535215 | A | 3/2017 |
| CN | 106535330 | A | 3/2017 |
| CN | 106716899 | A | 5/2017 |
| CN | 106850468 | A | 6/2017 |
| CN | 107046677 | A | 8/2017 |
| CN | 108289311 | A | 7/2018 |
| CN | 108365930 | A | 8/2018 |
| CN | 108616346 | A | 10/2018 |
| CN | 108631984 | A | 10/2018 |
| CN | 108632008 | A | 10/2018 |
| KR | 20130119269 | A | 10/2013 |
| KR | 20170134116 | A | 12/2017 |
| WO | 2019232456 | A1 | 12/2019 |

OTHER PUBLICATIONS

NTT Docomo, "Random access procedure for NB-PDSCH", 3GPP TSG RAN WG1 NB-IoT Ad-Hoc Meeting, R1-161022, St Julian's, Malta, Feb. 15-19, 2016, 3 pages.

Mitsubishi Electric, "Performance comparison of nonlinear precoding schemes for NR MU-MIMO", 3GPP TSG-RAN WG1 #86bis, R1-1610229, Lisbon, Portugal, Oct. 10-14, 2016, 12 pages.

3GPP TS 38.211 V15.3.0 (Sep. 2018), 3rd Generation Partnership Project; Technical Specification Group Radio Access Network; NR; Physical channels and modulation (Release 15), 96 pages.

Fischer, S. "Observed time difference of arrival (OTDOA) positioning in 3GPP LTE", Qualcomm Technologies, Inc., Jun. 6, 2014, 62 pages.

3GPP TS 38.133 V15.3.0 (Sep. 2018), 3rd Generation Partnership Project; Technical Specification Group Radio Access Network; NR; Requirements for support of radio resource management (Release 15), 136 pages.

3GPP TS 38.215 V15.3.0 (Sep. 2018), 3rd Generation Partnership Project; Technical Specification Group Radio Access Network; NR; Physical layer measurements (Release 15), 15 pages.

3GPP TS 38.305 V15.1.0 (Sep. 2018), 3rd Generation Partnership Project; Technical Specification Group Radio Access Network; NG Radio Access Network (NG-RAN); Stage 2 functional specification of User Equipment (UE) positioning in NG-RAN (Release 15), 63 pages.

Weimin, L. et al., "Research on Location Technology in LTE Communication System", Telecom Express, Telecommunications Information, Issue 07, Jun. 6, 2016, 8 pages.

* cited by examiner

METHOD AND APPARATUS FOR DETERMINING MEASURED VALUE OF REFERENCE SIGNAL

CROSS-REFERENCE TO RELATED APPLICATIONS

This application is a continuation of International Patent Application No. PCT/CN2019/101997, filed on Aug. 22, 2019, which claims priority to Chinese Patent Application No. 201811232063.4, filed on Oct. 22, 2018. The disclosures of the aforementioned applications are hereby incorporated by reference in their entireties.

TECHNICAL FIELD

The present invention relates to the positioning field in a wireless communications system, and specifically, to a method for determining a measured value of a reference signal.

BACKGROUND

In a wireless communications system, a terminal device may be positioned through a network device. There are at least two specific implementation methods. In the first method, the terminal device receives reference signals sent by a plurality of network devices, measures time of arrival of the plurality of reference signals, and then reports, to the network devices, time information obtained by the terminal device through measurement. The network devices obtain location information of the terminal device through inference based on a reported quantity of the terminal device. In the second method, the terminal device sends a reference signal, and a plurality of network devices measure the reference signal, to obtain time information. Then, the time information is aggregated to a network device or a location server, and the network device or the location server determines location information of a terminal.

In a long term evolution (LTE) system, a terminal device is positioned by using an observed time difference of arrival (OTDOA) method. A specific method is similar to the first method described above. The terminal device receives positioning reference signals sent by a plurality of network devices, measures a plurality of reference signal time differences (RSTD), and then reports, to the network devices, the RSTDs obtained by the terminal device through measurement. A network device or a location server obtains, based on the RSTDs, a distance difference between the terminal device and each network device, to further obtain location information of the terminal device.

When reporting the RSTD, the terminal device needs to quantize the RSTD obtained through measurement. In LTE, a reporting range of the RSTD is defined as −15391 Ts to 15391 Ts. When an absolute value of the RSTD is less than or equal to 4096 Ts, a quantization granularity for reporting is 1 Ts; or when an absolute value of the RSTD is greater than 4096 Ts, a quantization granularity for reporting is 5 Ts, where Ts=1/(2048*15000) seconds.

In new radio (NR), based on factors such as a deployment scenario and a frequency band, waveform parameters supported by a network device and a terminal device are more complex than those supported in the LTE system. A method for reporting an RSTD in an NR system is greatly different from that in the LTE system.

SUMMARY

Embodiments of this application provide a method and an apparatus for determining a measured value of a reference signal, to resolve a problem of determining a measured value or a reported value when different base stations in a positioning system have different waveform parameters or a same target terminal in a positioning system supports different waveform parameters.

To achieve the foregoing objective, the following technical solutions are used in the embodiments of this application.

According to a first aspect, a method for determining a measured value of a reference signal is provided. The method includes: A first device receives first configuration information sent by a second device. The first configuration information includes at least one of information about a reference signal, frequency range information of a radio frequency signal, or bandwidth range information. The first device measures a first reference signal set, to obtain a first measured value. The first reference signal set includes at least two reference signals. The first device determines an expansion factor α based on the first configuration information. The first device determines a second measured value based on the first measured value and the expansion factor α. In the foregoing technical solution, reference signals having different waveform parameters are measured to obtain the first measured value, and the expansion factor is obtained based on the waveform parameters, to determine the second measured value. This resolves a problem of determining a reference signal time difference, namely, the second measured value, when base stations having the different waveform parameters send the reference signals to a same target terminal. According to the foregoing method, positioning accuracy can be improved.

In a possible implementation of the first aspect, the information about the reference signal includes at least one of a subcarrier spacing, a frequency domain density, a time domain density, time location information, a frequency domain position offset, a scrambling ID, a frequency channel number, waveform information, BWP information, or QCL information.

In a possible implementation of the first aspect, the first device determines a reported value based on the second measured value. In the foregoing technical solution, the reported value is determined based on the second measured value, to resolve a problem that the base stations having the different waveform parameters position the same target terminal.

In a possible implementation of the first aspect, that the first device determines an expansion factor α based on the first configuration information includes: The first device uses a largest waveform parameter index in a plurality of waveform parameters in the first configuration information as the expansion factor α. Alternatively, the first device uses a smallest waveform parameter index in a plurality of waveform parameters in the first configuration information as the expansion factor α. Alternatively, the expansion factor α is pre-configured.

In a possible implementation of the first aspect, the first device sends the reported value to the second device.

In a possible implementation of the first aspect, that the first device determines a second measured value based on the first measured value and the expansion factor α includes: The first device determines a first extended time unit $T_s^{scale}$ based on the expansion factor α, and the first device determines the second measured value based on the first extended time unit $T_s^{scale}$. Alternatively, the first device determines a nominal measured value based on a preset time unit $T_s$, and the first device determines the second measured value based on the nominal measured value and the expansion factor α.

According to a second aspect, a method for determining a measured value of a reference signal is provided. The method includes: A second device sends first configuration information to a first device. The first configuration information includes at least one of information about a reference signal, frequency range information of a radio frequency signal, or bandwidth range information. The second device sends a first reference signal set to the first device, or measures a first reference signal set sent by the first device. The first reference signal set is used by the first device to perform measurement, and the first reference signal set includes at least two reference signals. The second device obtains a reported value. In the foregoing technical solution, reference signals having different waveform parameters are measured to obtain a first measured value, and an expansion factor is obtained based on the waveform parameters, to determine a second measured value. This resolves a problem of determining a reference signal time difference, namely, the second measured value, when base stations having the different waveform parameters send the reference signals to a same target terminal. According to the foregoing method, positioning accuracy can be improved.

In a possible implementation of the second aspect, the information about the reference signal includes at least one of a subcarrier spacing, a frequency domain density, a time domain density, time location information, a frequency domain position offset, a scrambling ID, a frequency channel number, waveform information, BWP information, or QCL information.

In a possible implementation of the second aspect, that the second device obtains a reported value includes: The second device receives a measurement report sent by the first device. The measurement report includes the reported value. Alternatively, the second device measures the first reference signal set sent by the first device, to obtain a first measured value. The second device determines a second measured value based on the first measured value and an expansion factor $\alpha$. The second device determines the reported value based on the second measured value. The expansion factor $\alpha$ is determined based on the first configuration information.

In a possible implementation of the second aspect, the second device sends the reported value to a third device.

In a possible implementation of the second aspect, that the expansion factor $\alpha$ is determined based on the first configuration information includes: The second device uses a largest waveform parameter index in a plurality of waveform parameters in the first configuration information as the expansion factor $\alpha$. Alternatively, the second device uses a smallest waveform parameter index in a plurality of waveform parameters in the first configuration information as the expansion factor $\alpha$. Alternatively, the expansion factor $\alpha$ is pre-configured.

In a possible implementation of the second aspect, after obtaining the reported value, the second device determines the second measured value based on the reported value, and obtains the first measured value based on the second measured value.

According to another aspect of this application, a first device is provided. The first device is configured to implement a function of the method for determining a measured value of a reference signal according to any of the first aspect or the possible implementation of the first aspect. The function may be implemented by hardware, or may be implemented by hardware executing corresponding software. The hardware or the software includes one or more units corresponding to the foregoing function.

In a possible implementation, a structure of the first device includes a processor. The processor is configured to support the first equipment in performing the method for determining a measured value of a reference signal according to any one of the first aspect or the possible implementations of the first aspect. Optionally, the first device may further include a memory and a communications interface. The memory stores code and data. The memory is coupled to the processor. The communications interface is coupled to the processor or the memory.

According to another aspect of this application, a second device is provided. The second device is configured to implement a function of the method for determining a measured value of a reference signal according to any one of the second aspect or the possible implementations of the second aspect. The function may be implemented by hardware, or may be implemented by hardware executing corresponding software. The hardware or the software includes one or more units corresponding to the foregoing function.

In a possible implementation, a structure of the second device includes a processor. The processor is configured to support a second device in performing the method for determining a measured value of a reference signal according to any one of the second aspect or the possible implementations of the second aspect. Optionally, the second device may further include a memory and a communications interface. The memory stores code and/or code required by a baseband processor. The memory is coupled to the processor. The communications interface is coupled to the memory or the processor.

According to another aspect of this application, a computer-readable storage medium is provided. The computer-readable storage medium stores instructions. When the instructions are run on a computer, the computer is enabled to perform the method for determining a measured value of a reference signal according to any one of the first aspect or the possible implementations of the first aspect, or the method for determining a measured value of a reference signal according to any one of the second aspect or the possible implementations of the second aspect.

According to another aspect of this application, a computer program product including instructions is provided. When the computer program product runs on a computer, the computer is enabled to perform the method for determining a measured value of a reference signal according to any one of the first aspect or the possible implementations of the first aspect, or the method for determining a measured value of a reference signal according to any one of the second aspect or the possible implementations of the second aspect.

According to another aspect of this application, a communications system is provided. The communications system includes a plurality of devices, and the plurality of devices include a first device and a second device. The first device is the first device according to the foregoing aspects, and is configured to support the first device in performing the method for determining a measured value of a reference signal according to any one of the first aspect or the possible implementations of the first aspect; and/or the second device is the second device according to the foregoing aspects, and is configured to support the second device in performing the method for determining a measured value of a reference signal according to any one of the second aspect or the possible implementations of the second aspect.

According to another aspect of this application, an apparatus is provided. The apparatus is a processor, an integrated circuit, or a chip, and is configured to perform the steps performed by a processing unit of the first device in the embodiments of the present invention, for example, determine a first measured value, a second measured value, and/or a reported value based on a received reference signal set and received first configuration information. The apparatus is further configured to perform processing or actions of the first device that has/have been described in the foregoing other aspects or embodiments. Details are not described herein again.

According to another aspect of this application, another apparatus is provided. The apparatus is a processor, an integrated circuit, or a chip, and is configured to perform the steps performed by a processing unit of the second device in the embodiments of the present invention. The apparatus is configured to support the second device in measuring the reference signals sent by the target terminal, to obtain the first measured value, and in determining the second measured value and/or the reported value based on the first measured value and the first configuration information in the foregoing embodiments. The another apparatus is further configured to perform processing or actions of the second device that has/have been described in the foregoing other aspects or embodiments. Details are not described herein again.

It may be understood that the apparatus, the computer-readable storage medium, or the computer program product of the foregoing method for determining a measured value of a reference signal is configured to perform corresponding method provided above. Therefore, for beneficial effects that can be achieved by the apparatus, the computer-readable storage medium, or the computer program product, refer to the beneficial effects of the corresponding method provided above. Details are not described herein again.

DETAILED DESCRIPTION OF ILLUSTRATIVE EMBODIMENTS

The following describes the technical solutions in the embodiments of the present invention with reference to the accompanying drawings in the embodiments of the present invention. Clearly, the described embodiments are merely some rather than all of the embodiments of the present invention. All other embodiments obtained by a person skilled in the art based on the embodiments of the present invention without creative efforts shall fall within the protection scope of the present invention.

It should be understood that names of all nodes and messages in this application are merely names specified for ease of description in this application, and may be different names in an actual network. It should not be understood that names of various nodes and messages are limited in this application. On the contrary, any name that has a same or similar function as that of a node or a message used in this application is considered as a method or an equivalent replacement in this application, and falls within the protection scope of this application. Details are not described below.

In a 5th generation mobile communications system (5th generation mobile networks or 5th generation wireless systems, 5G), positioning is used as a standard target of release 16 in NR, and a basic objective of 5G positioning is to improve positioning accuracy.

Figure 1:
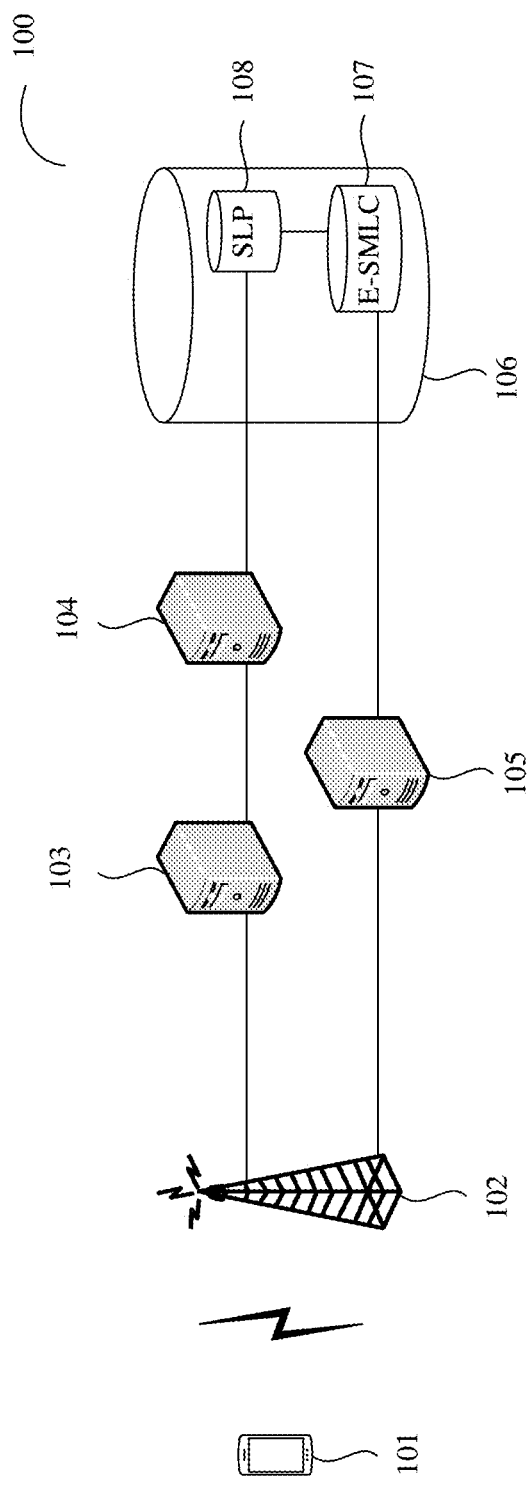
FIG. 1 is a schematic diagram of a positioning system according to an embodiment of the present invention.

To better understand a method and an apparatus for determining a measured value of a reference signal disclosed in the embodiments of the present invention, the following first describes a network architecture used in the embodiments of the present invention. FIG. 1 is a schematic structural diagram of a communications system applicable to an embodiment of this application.

It should be noted that the communications system mentioned in this embodiment of this application includes but is not limited to a narrowband internet of things (NB-IoT) system, a wireless local area network (WLAN) system, an LTE system, a next-generation 5G mobile communications system, or a communications system after 5G, for example, an NR system, or a device-to-device (D2D) communications system.

In the communications system shown in FIG. 1, an architecture of a conventional positioning system 100 is provided. The positioning system 100 includes at least a target terminal 101, a base station (BS) 102, and a location server (LS) 106. The location server LS 106 may be a physical entity or a logical entity. The location server LS 106 manages positioning for the target terminal 101 by obtaining measurement information and other location information from one or more positioning units, and further provides assistance data for the positioning unit to determine a location. The LS 106 may include a secure user plane location (SUPL) location platform (SLP) 108 and an enhanced serving mobile location centre (E-SMLC) 107, where the SLP 108 is used for user plane positioning, and the E-SMLC 107 is used for control plane positioning. The positioning system 100 may further include a serving gateway (S-GW) 103 and a packet gateway (P-GW) 104 for user plane positioning, and a mobility management entity (MME) 105 for control plane positioning.

The target terminal 101 in the positioning system includes but is not limited to any one of user equipment (UE), a mobile station, an access terminal, a subscriber unit, a subscriber station, a mobile station, a remote station, a remote terminal, a mobile device, a terminal, a wireless communications device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a 5G network, a terminal device in a future evolved public land mobile network (PLMN) network, and the like. The target terminal may also be referred to as a terminal device. Details are not described below.

The base station 102 includes but is not limited to an evolved NodeB (eNB), a radio network controller (RNC), a NodeB (NB), a base station controller (BSC), a base transceiver station (BTS), a home base station (for example, a home evolved NodeB, or home nodeB, HNB), a baseband unit (BBU), an eLTE (eLTE) base station, an NR base station (gNB), and the like.

In the positioning system 100, control plane positioning is mainly used for an emergency service. A positioning message is transmitted between the E-SMLC and the target terminal 101 by using a signaling connection. For user plane positioning, a positioning message is transmitted by using a data link. The SLP 108 processes an SULP message, and interfaces with the E-SMLC, to obtain the assistance data. The SULP message is routed through the P-GW and S-GW on the data link. A message between the target terminal 101 and the LS 106 is transmitted according to an LTE positioning protocol (LPP).

For ease of understanding, the following explains terms or concepts in the embodiments of this application.

A waveform parameter is a parameter of a subcarrier set or a part of physical subcarriers of a specific bandwidth or carrier. The waveform parameter includes at least one of the following parameters: a subcarrier spacing, a cyclic prefix (CP) length, a transmission time interval (TTI), a symbol length, a quantity of symbols, and μ, where μ is an integer greater than or equal to 0. Each μ corresponds to a specific subcarrier spacing and CP. A relationship between the subcarrier spacing and μ is: $\Delta f = 2^\mu \cdot 15$ [kHz], where $\Delta f$ is the subcarrier spacing, Hz is a basic unit of a frequency, and kHz represents kilo Hz, namely, kilohertz.

In NR, CPs include a normal CP and an extended CP. The normal CP is a CP whose length can meet a requirement of a major coverage scenario. The extended CP is a CP used to meet a requirement of relatively large coverage or a specific application scenario.

The subcarrier spacing in NR is $2^\mu \cdot 15$ kHz. Table 1 shows a relationship between a value of μ and the subcarrier spacing.

TABLE 1

| Waveform parameter | |
|---|---|
| μ | Subcarrier spacing (kHz) |
| 0 | 15 |
| 1 | 30 |
| 2 | 60 |
| 3 | 120 |
| 4 | 240 |

For ease of description, p is referred to as a waveform parameter index in this application.

Generally, different subcarrier spacings (SCS) have different applicable frequency bands. For example, in the normal CP, a 15 kHz or 30 kHz subcarrier spacing is used for a low-frequency, for example, sub-6 GHz (GHz), data and/or control channel; and a 60 kHz or 120 kHz subcarrier spacing is used for a high-frequency data channel. In addition, when the extended CP is used, a 60 kHz subcarrier spacing may further be used for the low-frequency data channel. In this application, it is not excluded that an additional subcarrier spacing, for example, a 480 kHz subcarrier spacing, is used for a reference signal used for positioning.

A beam is a communications resource. The beam may be a wide beam, a narrow beam, or a beam of another type. A technology for forming the beam may be a beamforming technology or another technology. The beamforming technology may be specifically a digital beamforming technology, an analog beamforming technology, or a hybrid digital/analog beamforming technology. Different beams may be considered as different resources. Same information or different information may be sent on different beams. Optionally, a plurality of beams having a same communication feature or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution that an antenna array enhances or weakens reception of a radio signal in different directions in space. It may be understood that, the one or more antenna ports forming one beam may also be considered as one antenna port set.

In a current NR protocol, a beam may be embodied by using a quasi colocation (QCL) relationship between antenna ports. Specifically, two signals on a same beam have a QCL relationship related to a spatial Rx parameter, namely, QCL-Type D: {Spatial Rx parameter} in a protocol. In the protocol, the beam may be specifically represented by using identifiers of various signals, for example, a resource identifier (ID) of a channel state information reference signal (CSI-RS), a time domain index of a synchronization signal/PBCH block (SS/PBCH block), a resource ID of a sounding signal (SRS), and a resource ID of a tracking signal (TRS).

The foregoing antenna port is a logical concept, and does not have a one-to-one correspondence with a physical antenna. The antenna port is a logical unit including one or more physical antennas used to transmit a signal or signal stream.

Considering that the foregoing NR system supports a plurality of subcarrier spacings, a same base station may configure and send signals with a plurality of different subcarrier spacings, and different base stations may also configure and send signals with a plurality of different subcarrier spacings. When there are a plurality of subcarrier spacings, because different subcarrier spacings correspond to different symbol lengths, positioning accuracy is reduced when a quantization granularity of LTE is used for the different symbol lengths. Therefore, it is necessary to provide a new method for determining a measured value of a reference signal, to provide more accurate positioning.

To resolve the foregoing problem, a method for determining a measured value of a reference signal is used in this embodiment. The method includes: A first device receives first configuration information sent by a second device. The first configuration information includes at least one of information about a reference signal, information about a subcarrier spacing, frequency range information of a radio frequency signal, or bandwidth range information. The first device measures a first reference signal set, to obtain a first measured value. The first reference signal set includes at least two reference signals. The first device determines an expansion factor α based on the first configuration information. The first device determines a second measured value based on the first measured value and the expansion factor α.

The information about the reference signal includes at least one of a subcarrier spacing, a frequency domain density, a time domain density, time location information, a frequency domain position offset, a scrambling ID, a frequency channel number, waveform information, BWP information, or QCL information.

Further, the method further includes: The first device determines a reported value based on the second measured value.

The first device measures the first reference signal set, to obtain the first measured value. That the first device determines a second measured value based on the first measured value and the expansion factor α includes: The first device determines a first extended time unit $T_s^{scale}$ based on the expansion factor α, and the first device determines the second measured value based on the first extended time unit $T_s^{scale}$. Alternatively, the first device determines a nominal measured value based on a preset time unit $T_s$, and the first device determines the second measured value based on the nominal measured value and the expansion factor α.

The first device includes but is not limited to a target terminal. The second device includes but is not limited to a base station, a location management function (location management function, LMF), or a location server (location server, LS).

Figure 2:
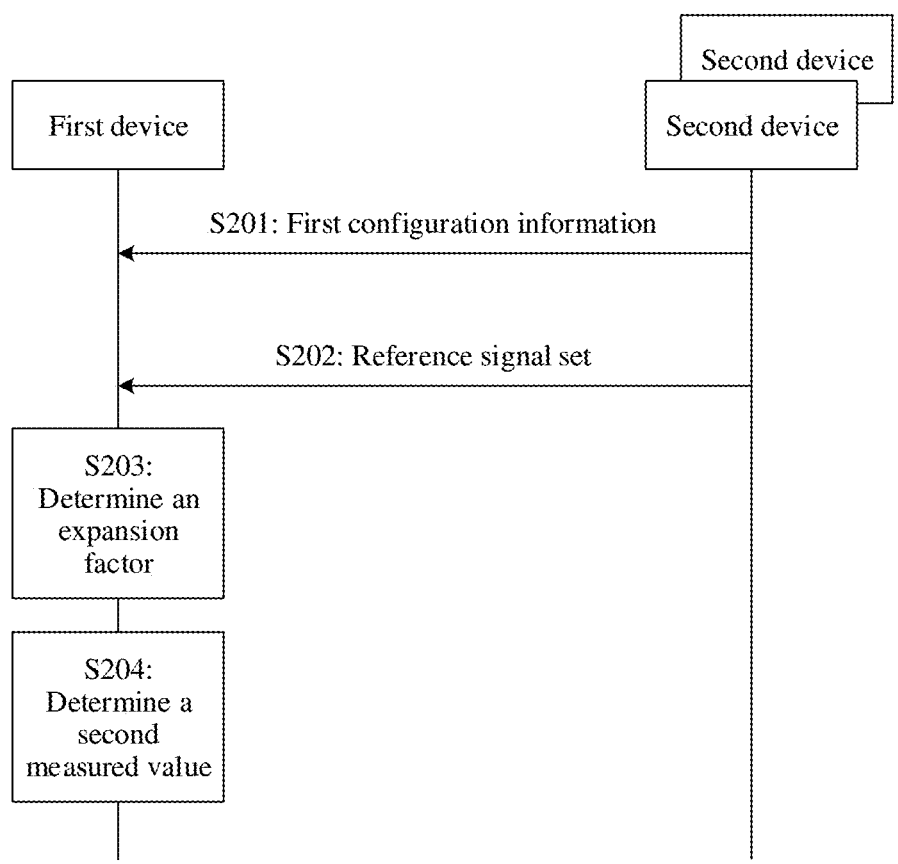
FIG. 2 shows a method for determining a second measured value according to an embodiment of the present invention.

FIG. 2 shows a method for determining a second measured value according to an embodiment of the present invention. The method includes the following steps.

S201: A first device sends first configuration information to a second device.

The first configuration information includes at least one of information about a reference signal, frequency range information of a radio frequency signal, or bandwidth range information.

The frequency range information of the radio frequency signal includes an index of a frequency range. For example, RF 1 and RF 2 indicate different frequency ranges. There may be a relatively large difference between subcarrier spacings used in different frequency ranges. For example, a 15 kHz subcarrier spacing is used when the frequency range is below 3 GHz, or a 30 kHz subcarrier spacing is used when the frequency range is above 6 GHz. A frequency range corresponding to the index of the frequency range is not limited in this application. In a possible implementation, for a range of a frequency signal, a frequency or a frequency range of the reference signal may be directly specified.

The bandwidth range information mainly includes bandwidth information of the reference signal. For example, a bandwidth range is less than 5 MHz, from 5 MHz to 10 MHz, or from 10 MHz to 20 MHz. A value of the bandwidth range is not limited in this application.

The information about the reference signal includes at least one of a subcarrier spacing, a frequency domain density, a time domain density, time location information, a frequency domain position offset, a scrambling ID, a frequency channel number, waveform information, BWP information, or QCL information.

Information about the subcarrier spacing includes a subcarrier spacing of one or more reference signals. The subcarrier spacing is described above. Details are not described again. When an OTDOA measurement method is used, an RSTD needs to support measurement of a plurality of reference signals. As described above, the reference signals may have different waveform parameters. Therefore, a subcarrier spacing needs to be configured for each reference signal. It should be understood that the reference signal includes but is not limited to a positioning reference signal (PRS), a demodulation reference signal (DMRS), a tracking reference signal (TRS), a CSI-RS, and an SRS.

The frequency domain density and the time domain density include distribution of reference signals in frequency domain/time, and depend on a protocol definition or a configuration. Different reference signals may have different configurations. A specific configuration is not limited in this application.

The time location information includes time domain position information, for example, one or a combination of a frame number, a subframe number, a slot index, or a symbol index. For example, for an $n^{th}$ symbol in a slot, n represents a location of a symbol in the slot, and one slot may include 12 or 14 symbols. Alternatively, the time location information may be included in the time domain density. A specific implementation is not limited in this application.

The frequency domain position offset includes an offset of the reference signal in frequency domain, and is usually represented by using a relative position of a resource element (RE).

The scrambling ID includes information required for generating a sequence of the reference signal, such as an initial parameter and a root sequence.

The frequency channel number is information about a frequency band in which the reference signal is located, and includes an identifier corresponding to a raster of a frequency used for uplink, downlink, or bidirectional transmission.

The waveform information includes single-carrier or multi-carrier. The multi-carrier is, for example, orthogonal frequency division multiplexing (OFDM). A specific waveform is not limited in this application.

The bandwidth part (BWP) information includes a BWP identifier or BWP configuration information. The BWP configuration information includes an index of a start physical resource block (PRB) of a BWP, a quantity of physical resource blocks, or an index of an end PRB, namely, a BWP frequency width.

The QCL (QCL) information includes spatial domain information of a beam, for example, a QCL type.

It should be noted that the first configuration information is sent by the second device to the first device. However, the first configuration information may be generated by the second device, or may be generated by a third device. In this case, the second device is a base station, and the third device may be a location server (LS) or a location management function (LMF). Generation of the first configuration information is not limited in this application.

In a possible implementation, the second device sends first configuration information of a plurality of reference signals or a plurality of groups of reference signals. Configuration information of the plurality of reference signals or the plurality of groups of reference signals has at least one different feature. For example, the reference signals have different time domain positions or frequency domain positions. In other words, the second device may send the first configuration information to the first device, for example, a target terminal, in a plurality of transmissions. It should be understood that the second device may alternatively send the configuration information of the plurality of reference signals to the first device through a same piece of first configuration information.

In a possible implementation, a network has a plurality of second devices, and at least one second device is configured to send one or more reference signals. Therefore, the first configuration information may further include information about a cell, for example, a physical cell identifier (PCI). The information, included in the first configuration information, about the plurality of reference signals includes at least one different parameter. For example, the reference signals have different time domain positions or frequency domain positions.

S202: The first device receives a reference signal set sent by the second device.

After configuring the first configuration information for the first device, the second device sends the reference signals to the first device. It should be understood that, one second device may send a plurality of reference signals to the first device, or a plurality of second devices may send reference signals to a same first device. The reference signals are referred to as the reference signal set.

The first device receives the reference signal set on a configured time-frequency resource based on the first configuration information, and measures the reference signals in the reference signal set, to obtain a first measured value. The first measured value includes a difference between time of arrival of two or more reference signals. For example, the first measured value is an absolute value of a difference between time of arrival of two reference signals, or the first measured value may be an average value of absolute values of differences between time of arrival, obtained by measuring reference signals for a plurality of times, of the reference signals. This is not limited in this application.

For the reference signals in the reference signal set, there may be the following cases.

Manner 1: When the at least one second device sends a plurality of reference signals, beams used to send the plurality of reference signals are the same. The beams of the plurality of reference signals correspond to a spatial transmission filter. The spatial transmission filter is used to form beams in different directions. In the following description, the reference signals may be sent in a same manner. Details are not described again.

Manner 2: When the at least one second device sends a plurality of reference signals, beams used by the first device to receive the plurality of reference signals are the same. The beams of the plurality of reference signals correspond to a spatial receive filter. The spatial receive filter is used to form beams in different directions. In the following description, the reference signals may be received in a same manner. Details are not described again.

Manner 3: When the at least one second device sends a plurality of reference signals, beams used to send the plurality of reference signals are the same, and beams used by the first device to receive the plurality of reference signals are the same.

Manner 4: When the at least one second device sends a plurality of reference signals, beams used to send the plurality of reference signals are different.

Manner 5: When the at least one second device sends a plurality of reference signals, beams used by the first device to receive the plurality of reference signals are different.

Manner 6: When the at least one second device sends a plurality of reference signals, beams used to send the plurality of reference signals are different, and beams used by the first device to receive the plurality of reference signals are different.

S203: The first device determines an expansion factor.

The first device may determine an expansion factor $\alpha$ after receiving the first configuration information. It should be understood that, only for a purpose of description, the first device determines the expansion factor after receiving the reference set. An execution sequence of the steps is not strictly limited in this embodiment.

Specifically, the first device determines the expansion factor $\alpha$ based on information about the reference signals in the first configuration information. In a possible implementation, it is assumed that the first configuration information includes information about two reference signals, subcarrier spacings of the two reference signals are respectively an SCS-1 and an SCS-2, and the expansion factor $\alpha$ may be a waveform parameter index corresponding to max{SCS-1, SCS-2}, where a max function indicates that a larger one of the SCS-1 and the SCS-2 is used. For example, if the subcarrier spacings of the two reference signals are respectively 15 kHz and 30 kHz, the expansion factor $\alpha$ is a waveform parameter index corresponding to a 30 kHz subcarrier spacing, and a value of is 1.

In a possible implementation, it is assumed that the first configuration information includes information about two reference signals, subcarrier spacings of the two reference signals are respectively an SCS-1 and an SCS-2, and the expansion factor $\alpha$ may be a waveform parameter index corresponding to min{SCS-1, SCS-2}, where a min function indicates that a smaller one of the SCS-1 and the SCS-2 is used. For example, if the subcarrier spacings of the two reference signals are respectively 30 kHz and 60 kHz, the expansion factor $\alpha$ is a waveform parameter index corresponding to a 30 kHz subcarrier spacing, and a value of is 1.

In a possible implementation, the expansion factor $\alpha$ may be pre-configured. Specifically, the expansion factor $\alpha$ may be directly specified in the first configuration information. If the expansion factor $\alpha$ is specified in the first configuration information, the first device uses the configured expansion factor $\alpha$. Alternatively, the expansion factor $\alpha$ may be configured by using a radio resource control (RRC) message. Alternatively, the expansion factor $\alpha$ may be predefined in a protocol. For example, a proper expansion factor is used as a reference to quantize the first measured value.

In a possible implementation, the expansion factor $\alpha$ may be determined according to a preset rule. For example, if a first measured value of the first device is obtained by subtracting time of arrival of a received second reference signal from time of arrival of a received first reference signal, the expansion factor $\alpha$ is a waveform parameter index corresponding to a subcarrier spacing of the second reference signal. For another example, if a first measured value of the first device is obtained by subtracting time of arrival of a received second reference signal from time of arrival of a received first reference signal, the expansion factor $\alpha$ is a waveform parameter index $\mu$ corresponding to a subcarrier spacing of the first reference signal.

In a possible implementation, the expansion factor $\alpha$ corresponding to the first measured value is determined by the first device. A specific method for determining the expansion factor $\alpha$ is not limited. For example, the expansion factor $\alpha$ is determined based on at least one of received reference signal quality, such as RSRP or RSRQ, a received signal strength indicator (RSSI), precision of the first measured value, a range of the first measured value, or a preset or configured threshold. For another example, the expansion factor $\alpha$ is determined based on a subcarrier spacing of an uplink channel used to feed back a measured value. The first device may further send the determined method or the determined expansion factor $\alpha$ to the second device.

It should be understood that only two reference signals are used as an example above. This application is not limited to a case in which there are only two reference signals. When there are a plurality of reference signals, a similar method is used. Specifically, if the first configuration information includes information about more than two reference signals, the first device may obtain a plurality of first measured values. For example, the first device receives a plurality of reference signals, and determines two first measured values: V1 and V2. For V1 and V2, there may be the following cases.

Manner 1: The first measured value V1 is obtained by subtracting the time of arrival of the first reference signal from the time of arrival of the second reference signal; and the first measured value V2 is obtained by subtracting the time of arrival of the first reference signal from time of arrival of a third reference signal.

Manner 2: The first measured value V1 is obtained by subtracting the time of arrival of the first reference signal from the time of arrival of the second reference signal; and the first measured value V2 is obtained by subtracting time of arrival of a third reference signal from time of arrival of a fourth reference signal.

Configuration information of the first reference signal, configuration information of the second reference signal, configuration information of the third reference signal, and configuration information of the fourth reference signal are not completely the same. An expansion factor $\alpha1$ corresponding to the first measured value V1 and an expansion factor $\alpha2$ corresponding to the first measured value V2 may be determined according to a unified rule, or may be determined according to respective rules. For example, in the manner 1, $\alpha1$ and $\alpha2$ are determined according to the unified rule, and each are specifically a waveform parameter corresponding to a minimum or maximum subcarrier spacing in the first reference signal, the second reference signal, the third reference signal, and the fourth reference signal. For example, in the manner 1, $\alpha1$ and $\alpha2$ are separately determined based on waveform parameters corresponding to subcarrier spacings of minuend signals (which respectively correspond to the second reference signal and the third reference signal). In the manner 2, $\alpha1$ and $\alpha2$ are separately determined based on waveform parameters corresponding to subcarrier spacings of minuend signals (which respectively correspond to the second reference signal and the fourth reference signal). For another example, in the manner 1, $\alpha1$ and $\alpha2$ are separately determined based on a waveform parameter corresponding to a subcarrier spacing of a subtractive signal (namely, the first reference signal). In the manner 2, $\alpha1$ and $\alpha2$ are separately determined based on waveform parameters corresponding to subcarrier spacings of minuend signals (which respectively correspond to the first reference signal and the third reference signal). For another example, in the manner 2, $\alpha1$ and $\alpha2$ are determined according to respective rules. The respective rules are described in the foregoing cases of the two reference signals. Details are not described herein again.

When there are a plurality of reference signals, in addition to the foregoing method for determining the expansion factor $\alpha$, a waveform parameter index that is closest to an average value of waveform parameter indexes of the plurality of reference signals may alternatively be selected as the expansion factor.

In a possible implementation, determining of the expansion factor $\alpha$ is related to a carrier frequency range of a reference signal. For example, when the reference signal is sent in a frequency range 1, the expansion factor $\alpha$ is determined according to a first mapping rule; or when the reference signal is sent in a frequency range 2, the expansion factor $\alpha$ is determined according to a second mapping rule.

In a possible implementation, determining of the expansion factor $\alpha$ is related to a bandwidth of a reference signal. For example, when the bandwidth of the reference signal is greater than a preset or configured threshold, the expansion factor $\alpha$ is determined according to a first mapping rule; or when the bandwidth of the reference signal is less than a preset or configured threshold, the expansion factor $\alpha$ is determined according to a second mapping rule.

In a possible implementation, determining of the expansion factor $\alpha$ is related to a quantity of valid resource elements of a reference signal. For example, when the quantity of valid resource elements of the reference signal is greater than a preset or configured threshold, the expansion factor $\alpha$ is determined according to a first mapping rule; or when the quantity of valid resource elements of the reference signal is less than a preset or configured threshold, the expansion factor $\alpha$ is determined according to a second mapping rule. The valid resource element indicates a quantity of valid resource elements included in one or more reference signal symbols.

In a possible implementation, determining of the expansion factor $\alpha$ is related to the foregoing plurality of factors. For example, the expansion factor $\alpha$ may be determined by using a combination or nesting of the foregoing plurality of methods.

S204: The first device determines a second measured value.

Specifically, the first device determines the second measured value based on the first measured value and the expansion factor $\alpha$. The second measured value is a quantized value, and is obtained by quantizing the first measured value.

The second measured value may be determined in a plurality of manners. The plurality of manners are described below.

In a possible implementation, the first device determines a first extended time unit $T_s^{scale}$ based on the expansion factor $\alpha$, and the first device determines the second measured value based on the first extended time unit $T_s^{scale}$. In this implementation, a quantization unit is first determined based on the expansion factor $\alpha$, and the quantization unit is the first extended time unit $T_s^{scale}$. The quantization unit is related to the expansion factor. For example, a nominal quantization unit is $T_s$, and the nominal quantization unit is a quantized reference unit. For example, $T_s=1/(\Delta f_{ref} \cdot N_{f,ref})$, where $\Delta f_{ref}=15 \cdot 10^3$ Hz, and $N_{f,ref}=2048$. After the expansion factor $\alpha$ is determined, the first extended time unit $T_s^{scale}=T_s \cdot 2^{-\alpha}$ may be determined. After the first extended time unit is obtained, the first measured value may be quantized. For example, if the first measured value is $\delta$, the second measured value may be $\delta/T_s^{scale}$. It should be understood that different quantization units may be used for first measured values in different ranges. For example, when the first measured value is less than or equal to a first measurement threshold, the first extended time unit $T_s^{scale}$ is used as the quantization unit; or when the first measured value is greater than a first measurement threshold, k times the first extended time unit is used as the quantization unit, where k is an integer greater than 1. This is merely an example. A specific implementation is not limited in this application.

In a possible implementation, the first device determines a nominal measured value based on a preset time unit $T_s$, and the first device determines the second measured value based on the nominal measured value and the expansion factor $\alpha$.

In this method, the time unit $T_s$ is a nominal quantization unit. As described above, details are not described again. The nominal measured value is a quantization result determined based on the first measured value and the nominal quantization unit $T_s$. For example, if the first measured value is δ, the nominal measured value is $δ/T_s$. The first device determines the second measured value based on the nominal measured value and the expansion factor α. For example, if the nominal measured value is $δ_{norm}$, the second measured value is $δ_{norm} \cdot 2^α$.

In a possible implementation, the first extended time unit $T_s^{scale}$ may be one of $T_c$, $2 \times T_c$, $4 \times T_c$, $8 \times T_c$, $16 \times T_c$, $32 \times T_c$, $64 \times T_c$, $128 \times T_c$, $256 \times T_c$, $512 \times T_c$, $1024 \times T_c$, $2048 \times T_c$, and $4096 \times T_c$, where $T_c=1/(480000 \times 4096)$ seconds. A specific value $T_s^{scale}$ corresponding to the expansion factor α may be reported by the first device, or specified by the second device, or determined based on a predefined mapping relationship. In specific implementation, a portion of first extended time units, for example, $32 \times T_c$, $64 \times T_c$, $128 \times T_c$, $256 \times T_c$, $512 \times T_c$, $1024 \times T_c$, $2048 \times T_c$, and $4096 \times T_c$, are used only in the frequency range 1; or a portion of first extended time units, for example, $T_c$, $2 \times T_c$, $4 \times T_c$, $8 \times T_c$, and $16 \times T_c$, are used only in the frequency range 2.

In a possible implementation, the first extended time unit $T_s^{scale}$ may alternatively be one of $T_c$, $5 \times T_c$, $10 \times T_c$, $20 \times T_c$, $40 \times T_c$, $80 \times T_c$, $160 \times T_c$, $320 \times T_c$, $640 \times T_c$, $1280 \times T_c$, $2560 \times T_c$, and $5120 \times T_c$, where $T_c=1/(480000 \times 4096)$ seconds. A specific value $T_s^{scale}$ corresponding to the expansion factor α may be reported by the first device, or specified by the second device, or determined based on a predefined mapping relationship. In specific implementation, a portion of first extended time units, for example, $40 \times T_c$, $80 \times T_c$, $160 \times T_c$, $320 \times T_c$, $640 \times T_c$, $1280 \times T_c$, $2560 \times T_c$, and $5120 \times T_c$, are used only in the frequency range 1; or a portion of first extended time units, for example, $T_c$, $5 \times T_c$, $10 \times T_c$, and $20 \times T_c$, are used only in the frequency range 2.

It should be understood that, the nominal quantization unit and the nominal measured value are calculated based on $T_s$ defined in a protocol, and the foregoing method may be generalized. Specifically, if the nominal quantization unit is less than $T_s$, the expansion factor α may be a negative value. For example, the nominal quantization unit is $T_s \cdot 2^{-β}$, where β is a non-negative integer. If the waveform parameter index is μ=0, the expansion factor is α=−β; or if the waveform parameter index μ=q, the expansion factor is α=−(β−q).

According to the foregoing embodiment, in an NR system, base stations that support different waveform parameters may jointly measure the target terminal, and quantize a measurement result by using a proper waveform parameter index based on different waveform parameters, thereby improving positioning accuracy.

Figure 3:
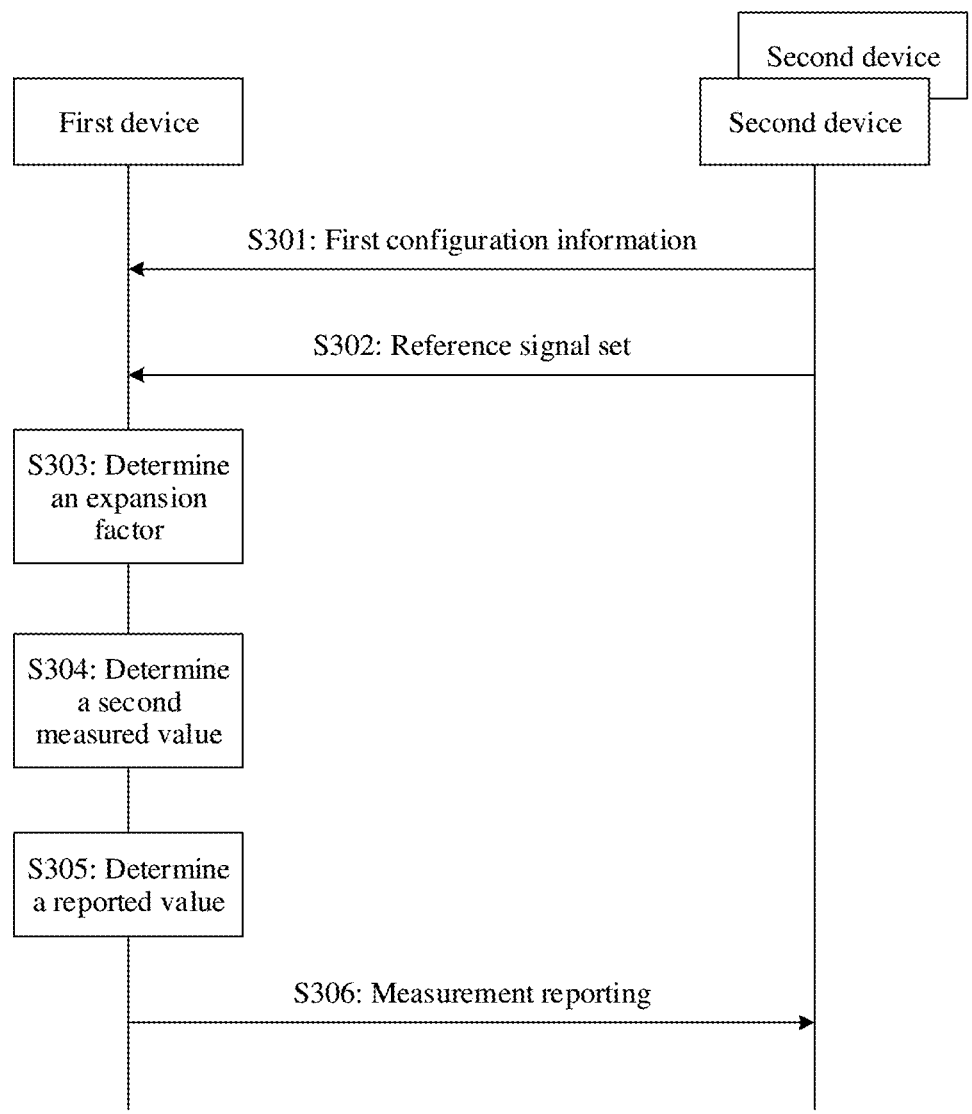
FIG. 3 shows a method in which a first device determines a reported value and performs measurement reporting according to an embodiment of the present invention.

FIG. 3 shows a method in which a first device determines a reported value and performs measurement reporting according to an embodiment of this application. Based on the embodiment shown in FIG. 2, the first device further determines the reported value. The first device determines the reported value based on the second measured value obtained in the embodiment in FIG. 2. Steps are as follows:

S301 to S304 are the same as steps S201 to S204. Details are not described again.

S305: The first device determines the reported value.

In this embodiment of this application, a method for determining the reported value may be obtained by searching a table by using the second measured value. For example, the quantization unit, the second measured value, and the reported value may form a table shown in the following Table 2.

TABLE 2

Mapping table of a reported value, a measured value, and a quantization unit

| Reported value | Second measured value | Quantization unit |
| --- | --- | --- |
| RSTD_m1 | Val_k1 ≤ RSTD_q < Val_k2 | $T_s$ |
| RSTD_m2 | Val_k3 ≤ RSTD_q < Val_k4 | $T_s$ |
| ... | ... | ... |

In Table 2, RSTD_m1 and RSTD_m2 each represent a reported value. RSTD_q represents the second measured value obtained in the embodiment in FIG. 2. Val_k1, Val_k2, Val_k3, and Val_k4 each represent a range to which the second measured value belongs, where Val_k1<Val_k2, and Val_k3<Val_k4. For example, in the foregoing table, the quantization unit is $T_s$.

It should be understood that, based on the foregoing embodiment, the quantization unit may alternatively be the first extended time unit $T_s^{scale}$ determined based on the expansion factor α. The second measured value is determined based on the first extended time unit $T_s^{scale}$, and then the reported value may be obtained through table lookup.

It should be understood that, Table 2 is merely an example, and an actual table is designed based on positioning accuracy and a design requirement. A specific value is not limited in this application.

In a possible implementation, Table 2 may be designed based on a nominal quantization unit $T_s$ and a nominal measured value. As described above, the nominal measured value is obtained based on the first measured value and the nominal quantization unit $T_s$. Details are not described again. In this case, the second measured value in Table 2 is the nominal measured value. When the reported value is determined, the second measured value is first determined based on the nominal measured value and the expansion factor α, and the second measured value is $δ_{norm} \cdot 2^α$. As described above, details are not described again. The reported value is then determined based on the obtained second measured value. Specifically, the reported value may be obtained according to another table, or may be determined according to Table 2. A specific implementation is not limited in this application.

S306: A first device performs measurement reporting.

A measurement report includes at least the reported value, and may further include one or more of information about a reference signal (for example, a subcarrier spacing of the reference signal and a bandwidth of the reference signal), a sending frequency band of the reference signal, quality information (for example, RSRP) of a reference signal received by a second device, or a cell identity of the reference signal; or one or more of QCL information of the reference signal, quality information (for example, RSRP) of a reference signal received by a second device, a cell identifier of the reference signal, or an identifier (for example, a resource identifier or number of the reference signal) of the reference signal.

In a possible implementation, the first device obtains N reference signals and at least one first measured value through measurement. The first measured value may be time of arrival (TOA) or an RSTD. The reported value determined by the first device includes M of the N reference signals and the at least one first measured value, where M and N are integers, and M≤N. The M reported reference signals may be determined by the first device or the second device. This is not limited in this application. If the M reported reference signals are determined by the second device, the second device specifies, in first configuration information, a criterion for reporting the reference signals. For example, when a threshold of a measured reference signal is greater than a threshold, the reference signal is reported. The threshold of the reference signal may be reference signal received power (RSRP) or reference signal received quality (RSRQ).

In a possible implementation, the N reference signals are from K different reference signal groups. The first device selects one or more reference signals from each cell or a group of reference signals that have same QCL information as the reported reference signals. The reference signal groups may be defined by using different methods. For example, reference signals from a same cell are considered to belong to a same reference signal group, or reference signals having same QCL information are considered to belong to a same reference signal group.

After determining the reported value, the first device may send a reported quantity to the second device through a PUSCH or according to an NR positioning protocol (NR positioning protocol, NRPP). Specific signaling used for transmission is not limited in this application.

After receiving the measurement report of the first device, the second device determines location information of the first device. Specifically, one reported value is used as an example. After obtaining the reported value, the second device may determine the second measured value, and determine the expansion factor α based on a waveform parameter index corresponding to the second measured value. For example, the quantization unit is the nominal quantization unit, and the second measured value is denoted as $R_{meas}$. In this case, the first measured value is $T_s \cdot R_{meas} \cdot 2^{-\alpha}$.

It should be understood that, when the reference signals measured by the first device are from different second devices, the measurement report is sent only to a current serving node of the first device, and is not sent to the plurality of second devices. The second device may be a base station or a location server. The location server may be a location management function.

Based on the foregoing embodiment, a target terminal can obtain the reported value based on the second measured value, and the second device can obtain a positioning measurement result by using signaling, and obtain the first measured value based on the reported value in the measurement report. Therefore, a problem of positioning a same target terminal between base stations having different waveform parameters is resolved, and positioning accuracy is improved.

The foregoing embodiment mainly describes a method in which the second device sends the reference signal, and the first device receives and measures the reference signal, and obtains the reported value based on a measurement result. The second device is a network device, the network device may be the base station, the location server, or the location management function. The first device is the target terminal. However, in an actual use process, this application is not limited to the foregoing scenario. Alternatively, the target terminal may send the reference signal, and the network device receives the reference signal sent by the target terminal. The reference signal is mainly an uplink reference signal, and includes but is not limited to a DMRS, an SRS, and a PRS.

Figure 4:
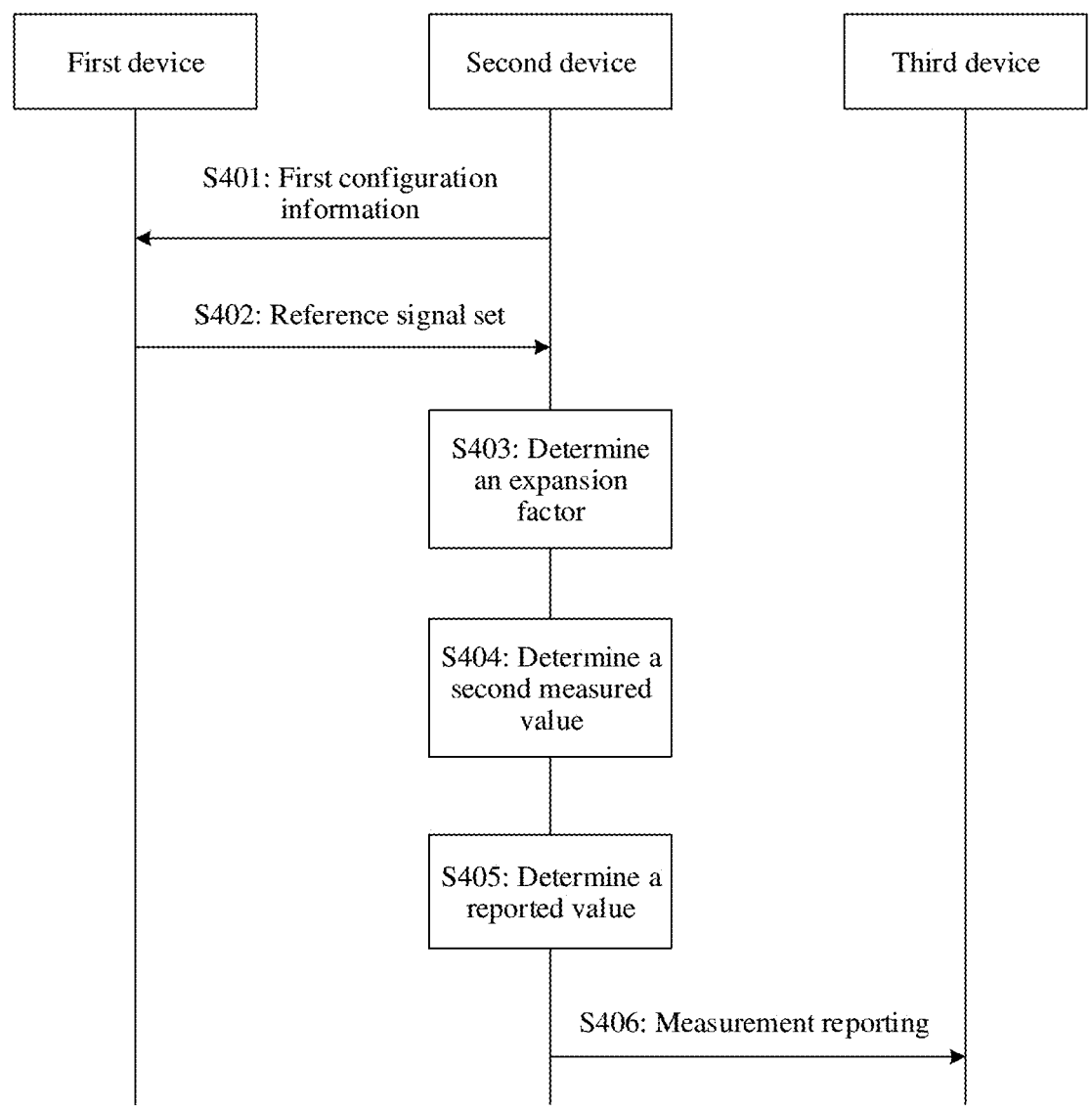
FIG. 4 is a flowchart of sending a reference signal by a target terminal according to an embodiment of the present invention.

FIG. 4 is a schematic diagram in which a target terminal sends a reference signal and a network device measures the reference signal. In FIG. 4, a first device is the target terminal, a second device is a base station, and a third device is a location server or a location management function. Steps are as follows:

S401 is the same as step S201. A difference is that content included in first configuration information in S401 is different from content in the first configuration information in step S201. In S401, the first configuration information mainly includes an uplink reference signal set configured by the second device for the first device and a time-frequency resource of one or more reference signals in a first reference signal set, and is used by the first device to transmit an uplink reference signal on a specified time-frequency resource.

Particularly, the plurality of reference signals in the first configuration information may be transmitted in different BWPs, and the different BWPs use a same waveform parameter or different waveform parameters. It should be understood that the plurality of reference signals may alternatively be transmitted in a same BWP.

S402: The first device sends the reference signal set.

The first device sends the reference signal set based on the first configuration information, and the reference signals in the reference signal set are sent on the specified time-frequency resource.

S403 to S405 are the same as steps S303 to S305. A difference is that S403 to S405 are performed by the second device. Details are not described again.

S406 is the same as step S306. A difference is that a measurement report is sent by the second device to the third device. The third device is the location management function or a location server.

After receiving the measurement report, the third device determines a first measured value based on a reported value and an expansion factor. S406 is the same as step S306. Details are not described again.

Based on the foregoing embodiment, network-based positioning can be implemented. The reference signal sent by the target terminal is configured, so that a same base station can support positioning methods having different waveform parameters, or base stations having different waveform parameters can measure the target terminal. Positioning accuracy can be improved by processing the waveform parameters.

The foregoing mainly describes the solutions provided in the embodiments of this application from a perspective of interaction between network elements. It can be understood that, to implement the foregoing functions, the network elements, for example, the first device and the second device, include corresponding hardware structures and/or software modules for performing the functions. A person skilled in the art should be easily aware that, in combination with the examples described in the embodiments disclosed in this specification, network elements and algorithm steps can be implemented by using hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into the functional modules may be performed on the first device and the second device based on the foregoing method examples. For example, each of the first device and the second device may be divided into functional modules, or two or more functions may be integrated into one processing module. The integrated module may be implemented in a form of hardware, or may be implemented in a form of a software functional module. It should be noted that, in the embodiments of this application, division into the modules is an example, and is merely logical function division. In an actual implementation, another division manner may be used. It should also be understood that, the first device may be a target terminal, and the second device may be a base station, a location server, or a location management function.

Figure 5:
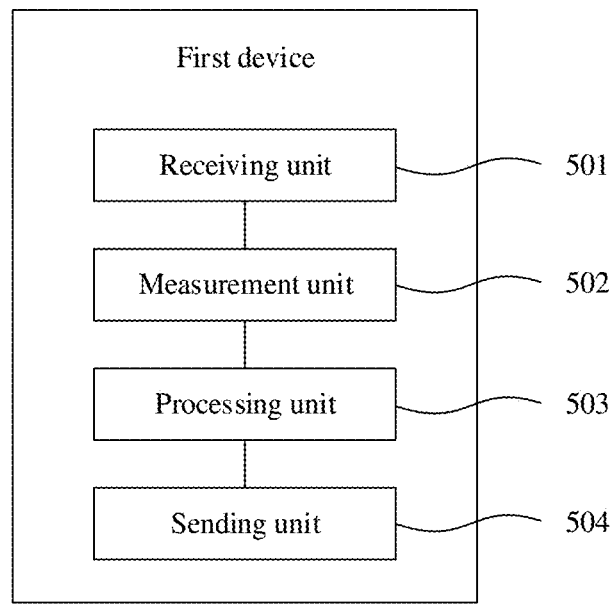
FIG. 5 is a possible schematic structural diagram of a first device according to an embodiment of the present invention.

FIG. 5 is a possible schematic structural diagram of a first device in the foregoing embodiments provided in this application. In this application, the first device may be a target terminal. The first device includes a receiving unit 501, a measurement unit 502, and a processing unit 503. The receiving unit 501 is configured to support the first device in performing S201 in FIG. 2, S301 in FIG. 3, and S401 in FIG. 4, and is further configured to: perform S202 in FIG. 2 and receive the reference signal set in S302 in FIG. 3. The measurement unit 502 is configured to support the first device in measuring the reference signal after the first device receives the reference signal in S202 in FIG. 2, or in measuring the reference signal after the first device receives the reference signal in S302 in FIG. 3. The processing unit 503 is configured to support a first device in performing S203 or S204 in FIG. 2, and S303, S304, or S305 in FIG. 3. The first device may further include a sending unit 504, configured to support the first device in performing S306 in FIG. 3 and S402 in FIG. 4.

In hardware implementation, the receiving unit 501 may be a receiver, the sending unit 504 may be a transmitter, and the receiver and the transmitter are integrated into a communications unit to form a communications interface.

Figure 6:
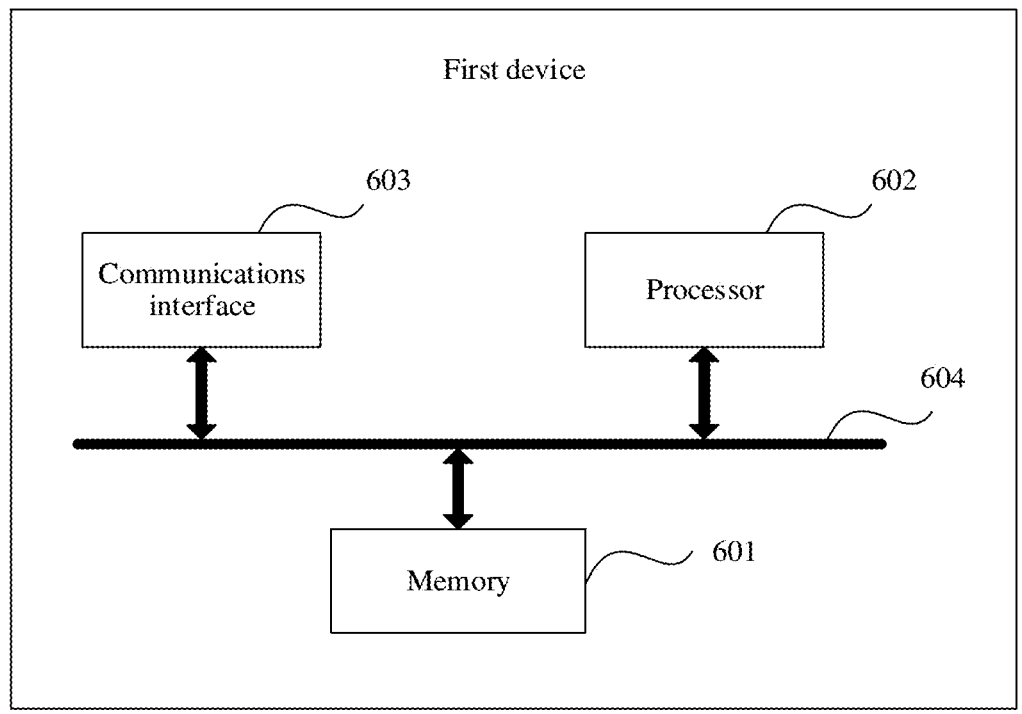
FIG. 6 is a schematic diagram of a possible logical structure of a first device according to an embodiment of the present invention.

FIG. 6 is a schematic diagram of a possible logical structure of a first device in the foregoing embodiments according to an embodiment of this application. The first device includes a processor 602. In this embodiment of this application, the processor 602 is configured to control and manage an action of the first device. For example, the processor 602 is configured to support the first device in performing S203 and S204 in FIGS. 2 and S303, S304, and S305 in FIG. 3 in the foregoing embodiments. Optionally, the first device may further include a memory 601 and a communications interface 603. The processor 602, the communications interface 603, and the memory 601 may be connected to each other or connected to each other through a bus 604. The communications interface 603 is configured to support the first device in performing communication, and the memory 601 is configured to store program code and data of the first device. The processor 602 invokes the code stored in the memory 601 to perform control management. The memory 601 may be coupled to or not coupled to the processor.

The processor 602 may be a central processing unit, a general purpose processor, a digital signal processor, an application-specific integrated circuit, a field programmable gate array or another programmable logic device, a transistor logic device, a hardware component, or any combination thereof. The processor 602 may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The bus 604 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 6, but this does not mean that there is only one bus or only one type of bus.

Figure 7:
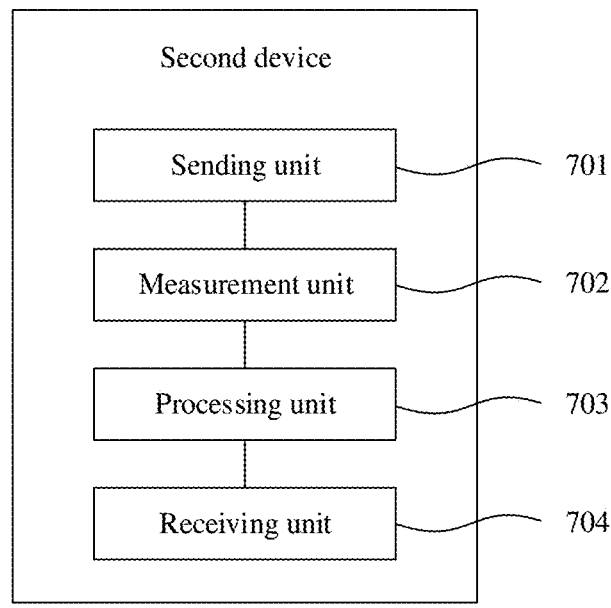
FIG. 7 is a possible schematic structural diagram of a second device according to an embodiment of the present invention.

FIG. 7 is a possible schematic structural diagram of a second device in the foregoing embodiments provided in this application. In this application, the second device is a base station, a location server, or a location management function. The second device includes a sending unit 701, a measurement unit 702, and a processing unit 702. The sending unit 701 is configured to support the second device in performing S201 in FIG. 2, S301 in FIG. 3, and S401 in FIG. 4, and is further configured to support the second device in performing S202 in FIG. 2 and S302 in FIG. 3. The measurement unit 702 is configured to support the second device in measuring the reference signals in the reference signal set after the second device receives, in S402 in FIG. 4, the reference signal set sent by the first device. The processing unit 702 is configured to support the second device in performing S403, S404, or S405 in FIG. 4.

The second device may further include a receiving unit 705, configured to support the second device in performing S402 in FIG. 4. The receiving unit 705 is further configured to support the second device in performing S306 in FIG. 3 and S402 in FIG. 4.

In hardware implementation, the sending unit 701 may be a transmitter, the receiving unit 704 may be a receiver, and the receiver and the transmitter are integrated into a communications unit to form a communications interface.

Figure 8:
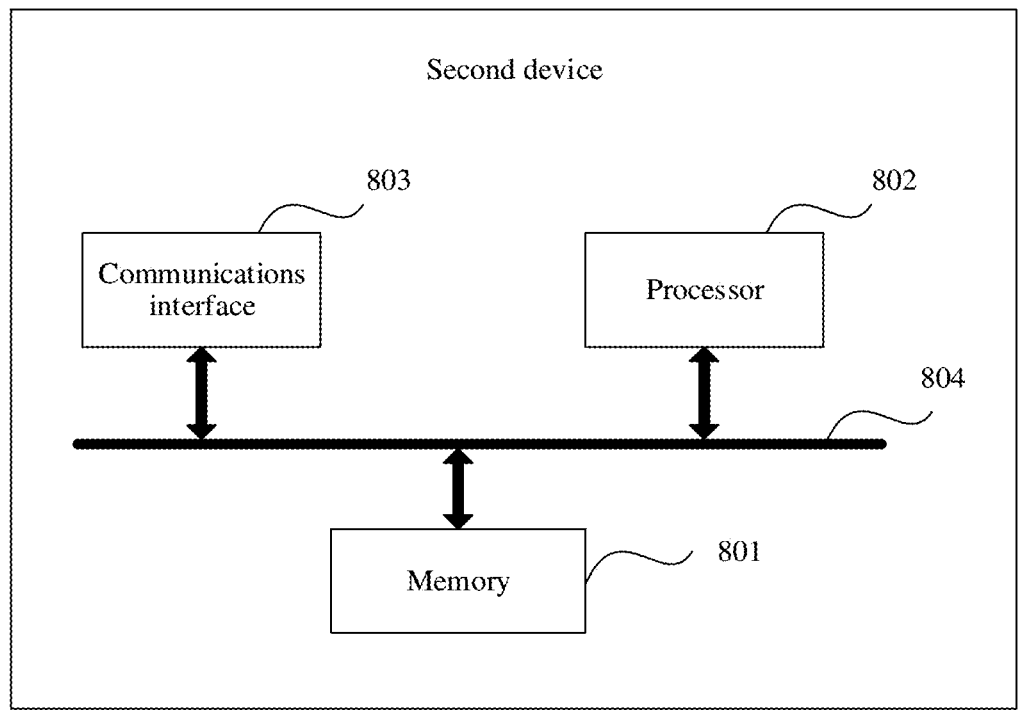
FIG. 8 is a schematic diagram of a possible logical structure of a second device according to an embodiment of the present invention.

FIG. 8 is a schematic diagram of a possible logical structure of a second device in the foregoing embodiments according to an embodiment of this application. The second device includes a processor 802. In this embodiment of this application, the processor 802 is configured to control and manage an action of the second device. For example, the processor 802 is configured to support the second device in performing S403, S404, or S405 in FIG. 4 in the foregoing embodiments. Optionally, the second device may further include a memory 801 and a communications interface 803. The processor 802, the communications interface 803, and the memory 801 may be connected to each other or connected to each other through a bus 804. The communications interface 803 is configured to support the second device in performing communication, and the memory 801 is configured to store program code and data of the second device. The processor 802 invokes the code stored in the memory 801 to perform control management. The memory 801 may be coupled to or not coupled to the processor.

The processor 802 may be a central processing unit, a general purpose processor, a digital signal processor, an application-specific integrated circuit, a field programmable gate array or another programmable logic device, a transistor logic device, a hardware component, or any combination thereof. The processor 802 may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The bus 804 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 8, but this does not mean that there is only one bus or only one type of bus.

In another embodiment of this application, a readable storage medium is further provided. The readable storage medium stores computer-executable instructions. When a device (which may be a single-chip microcomputer, a chip, or the like) or a processor performs the steps performed by the first device or the second device in the method for determining a measured value of a reference signal in FIG. 2, FIG. 3, or FIG. 4, the device or the processor reads the computer-executable instructions in the storage medium. The foregoing readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device implements the steps performed by the first device or the second device in the method for determining a measured value of a reference signal provided in FIG. 2 to FIG. 4.

In another embodiment of this application, a communications system is further provided. The communications system includes at least a first device and a second device. The second device includes a base station, a location server, or a location management function. The first device may be the first device provided in FIG. 5 or FIG. 6, and is configured to perform the steps performed by the first device in the method for determining a measured value of a reference signal provided in FIG. 2 to FIG. 4; and/or the second device may be the second device provided in FIG. 7 or FIG. 8, and is configured to perform the steps performed by the second device in the method for determining a measured value of a reference signal provided in FIG. 2 to FIG. 4. It should be understood that the communications system may include a plurality of first devices and a plurality of second devices. The first device may simultaneously measure reference signals sent by the plurality of second devices, and determine a second measured value and/or a reported value. Alternatively, the first device may send one or more reference signals to a plurality of second devices, so that the one or more second devices measure the reference signals sent by the first device, to obtain a first measured value and/or a second measured value. The second device may further determine a reported value, and send the reported value to a third device.

In this embodiment of this application, the first device receives a reference signal set sent by the second device, and measures signals in the reference signal set, to obtain a second measured value and/or a reported value of reference signals having different waveform parameters, so that the second measured value can be obtained more accurately, thereby improving positioning accuracy. Alternatively, the second device may receive a reference signal set sent by the first device, measure reference signals sent by the first device, and obtain a second measured value and/or a reported value of reference signals having different waveform parameters, thereby improving positioning accuracy.

In addition, a target terminal can be positioned between base stations that can support different waveform parameters in an NR system.

Finally, it should be noted that the foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A method, comprising:
receiving, by a first device, first configuration information sent by a second device, wherein the first configuration information comprises at least one of information about a reference signal, frequency range information of a radio frequency signal, or bandwidth range information;
measuring, by the first device, a first reference signal set, to obtain a first measured value, wherein the first reference signal set comprises at least two reference signals;
determining, by the first device, an expansion factor $\alpha$ based on the first configuration information; and
determining, by the first device, a reported value based on the first measured value, wherein the reported value indicates a quantized value range corresponding to the first measured value, and the quantized value range corresponding to the first measured value is related to the expansion factor $\alpha$; and
wherein the quantized value range corresponding to the first measured value is determined based on a quantization unit and the first measured value, a value of the quantization unit depends on a value of the expansion factor $\alpha$ and is one of $T_c$, $2 \times T_c$, $4 \times T_c$, $8 \times T_c$, $16 \times T_c$, or $32 \times T_c$, and wherein $T_c = 1/(480000 \times 4096)$ seconds.

2. The method according to claim 1, wherein the information about the reference signal comprises at least one of a subcarrier spacing, a frequency domain density, a time domain density, time location information, a frequency domain position offset, a scrambling ID, a frequency channel number, waveform information, bandwidth part (BWP) information, or quasi co-location (QCL) information.

3. The method according to claim 1, wherein determining, by the first device, the expansion factor $\alpha$ based on the first configuration information comprises:
determining, by the first device, the expansion factor $\alpha$ based on a carrier frequency range of at least one reference signal of the at least two reference signals.

4. The method according to claim 3, further comprising:
sending, by the first device, the expansion factor $\alpha$ to the second device.

5. The method according to claim 1, further comprising:
sending, by the first device, the reported value to the second device.

6. The method according to claim 1, wherein the first device is a terminal device, and the second device is a location server.

7. A first device, comprising:
a receiver, configured to receive first configuration information sent by a second device, wherein the first configuration information comprises at least one of information about a reference signal, frequency range information of a radio frequency signal, or bandwidth range information;

at least one processor; and a non-transitory computer readable storage medium storing a program executable by the at least one processor, the program including instructions for:

measuring a first reference signal set, to obtain a first measured value, wherein the first reference signal set comprises at least two reference signals;

determining an expansion factor α based on the first configuration information; and determining a reported value based on the first measured value, wherein the reported value indicates a quantized value range corresponding to the first measured value, and the quantized value range corresponding to the first measured value is related to the expansion factor α; and wherein the quantized value range corresponding to the first measured value is determined based on a quantization unit and the first measured value, a value of the quantization unit depends on a value of the expansion factor α and is one of $T_c$, $2 \times T_c$, $4 \times T_c$, $8 \times T_c$, $16 \times T_c$, or $32 \times T_c$, and wherein $T_c = 1/(480000 \times 4096)$ seconds.

8. The first device according to claim 7, wherein the information about the reference signal comprises at least one of a subcarrier spacing, a frequency domain density, a time domain density, time location information, a frequency domain position offset, a scrambling ID, a frequency channel number, waveform information, bandwidth part (BWP) information, or quasi co-location (QCL) information.

9. The first device according to claim 7, wherein the instructions for determining the expansion factor α based on the first configuration information comprise instructions for determining the expansion factor α based on a carrier frequency range of at least one reference signal of the at least two reference signals.

10. The first device according to claim 7, wherein the first device further comprises a transmitter, configured to send the reported value to the second device.

11. The first device according to claim 10, wherein the transmitter is further configured to send the expansion factor α to the second device.

12. The first device according to claim 7, wherein the program further includes instructions for:

sending the reported value to the second device.

13. The first device according to claim 7, wherein the first device is a terminal device, and the second device is a location server.

14. A system comprising:

a first device, configured to:

receive first configuration information sent by a second device, wherein the first configuration information comprises at least one of information about a reference signal, frequency range information of a radio frequency signal, or bandwidth range information;

measure a first reference signal set, to obtain a first measured value, wherein the first reference signal set comprises at least two reference signals;

determine an expansion factor α based on the first configuration information; and determine a reported value based on the first measured value, wherein the reported value indicates a quantized value range corresponding to the first measured value, and the quantized value range corresponding to the first measured value is related to the expansion factor α; and the second device, configured to send the configuration information to the first device; and wherein the quantized value range corresponding to the first measured value is determined based on a quantization unit and the first measured value, a value of the quantization unit depends on a value of the expansion factor α and is one of $T_c$, $2 \times T_c$, $4 \times T_c$, $8 \times T_c$, $16 \times T_c$, or $32 \times T_c$, and wherein $T_c = 1/(480000 \times 4096)$ seconds.

15. The system according to claim 14, wherein the information about the reference signal comprises at least one of a subcarrier spacing, a frequency domain density, a time domain density, time location information, a frequency domain position offset, a scrambling ID, a frequency channel number, waveform information, bandwidth part (BWP) information, or quasi co-location (QCL) information.

16. The system according to claim 14, wherein the first device is configured to determine the expansion factor α based on a carrier frequency range of at least one reference signal of the at least two reference signals.

17. The system according to claim 14, wherein the first device is further configured to send the reported value to the second device.

18. The system according to claim 17, wherein the first device is further configured to send the expansion factor α to the second device.

19. The system according to claim 14, wherein the second device is further configured to receive the reported value from the first device.

20. The system according to claim 19, wherein the second device is further configured to receive the expansion factor α from the first device.

21. The system according to claim 14, wherein the first device is further configured to:

send the reported value to the second device.

22. The system according to claim 14, wherein the first device is a terminal device, and the second device is a location server.

23. A non-transitory computer-readable storage medium storing instructions, wherein when the instructions are run on a computer, the computer is caused to:

receive first configuration information sent by a second device, wherein the first configuration information comprises at least one of information about a reference signal, frequency range information of a radio frequency signal, or bandwidth range information;

measure a first reference signal set, to obtain a first measured value, wherein the first reference signal set comprises at least two reference signals;

determine an expansion factor α based on the first configuration information; and determine a reported value based on the first measured value, wherein the reported value indicates a quantized value range corresponding to the first measured value, and the quantized value range corresponding to the first measured value is related to the expansion factor α; and wherein the quantized value range corresponding to the first measured value is determined based on a quantization unit and the first measured value, a value of the quantization unit depends on a value of the expansion factor α and is one of $T_c$, $2 \times T_c$, $4 \times T_c$, $8 \times T_c$, $16 \times T_c$, or $32 \times T_c$, and wherein $T_c = 1/(480000 \times 4096)$ seconds.

24. The non-transitory computer-readable storage medium storing instructions according to claim 23, wherein when the instructions are run on a computer, the computer is caused to:

send the reported value to the second device.

25. The non-transitory computer-readable storage medium storing instructions according to claim 23, wherein the non-transitory computer-readable storage medium is applied to a terminal device, and the second device is a location server.

* * * * *

UNITED STATES PATENT AND TRADEMARK OFFICE
CERTIFICATE OF CORRECTION

PATENT NO. : 11,838,783 B2
APPLICATION NO. : 17/237658
DATED : December 5, 2023
INVENTOR(S) : Yan et al.

It is certified that error appears in the above-identified patent and that said Letters Patent is hereby corrected as shown below:

In the Specification

In Column 7, Line 57, delete "p" and insert -- µ --.

In Column 12, Line 12, after "index" insert -- µ --.

In Column 12, Line 17, after "index" insert -- µ --.

In Column 12, Line 18, after "of" insert -- µ --.

In Column 12, Line 23, after "index" insert -- µ --.

In Column 12, Line 28, after "index" insert -- µ --.

In Column 12, Line 29, after "of" insert -- µ --.

In Column 12, Line 48, after "index" insert -- µ --.

In Column 19, Line 42, delete "FIGS." and insert -- FIG. --.

Signed and Sealed this
Twentieth Day of February, 2024

Katherine Kelly Vidal
*Director of the United States Patent and Trademark Office*